United States Patent
Li

(10) Patent No.: US 6,935,787 B2
(45) Date of Patent: Aug. 30, 2005

(54) OIL-CIRCULATING STRUCTURE FOR FAN

(76) Inventor: Nien-Lun Li, 11Fl., No. 5, Tianshiang 5th St., Taoyuan City, Taoyuan (TW)

( * ) Notice: Subject to any disclaimer, the term of this patent is extended or adjusted under 35 U.S.C. 154(b) by 53 days.

(21) Appl. No.: 10/617,776

(22) Filed: Jul. 14, 2003

(65) Prior Publication Data

US 2005/0013520 A1 Jan. 20, 2005

(51) Int. Cl.[7] .............................................. F16C 33/10
(52) U.S. Cl. ....................................... 384/292; 384/378
(58) Field of Search ................................ 384/279, 291, 384/292, 286, 378; 417/423.12, 423.13

(56) References Cited

U.S. PATENT DOCUMENTS

| 4,105,267 | A | * | 8/1978 | Mori | 384/291 |
| 5,630,953 | A | * | 5/1997 | Klink | 219/121.69 |
| 5,932,946 | A | * | 8/1999 | Miyasaka et al. | 384/279 |
| 6,494,621 | B2 | * | 12/2002 | Markovitch | 384/292 |
| 6,626,577 | B1 | * | 9/2003 | Horng et al. | 384/292 |
| 2002/0172609 | A1 | * | 11/2002 | Hsieh | 417/423.7 |

* cited by examiner

Primary Examiner—Thomas R. Hannon
(74) Attorney, Agent, or Firm—Troxell Law Office, PLLC

(57) ABSTRACT

An oil-circulating structure for fan has an oily bearing with a central axis hole for pivoting a fan shaft. An oil-collecting recess trench is formed on the inside wall of the axis hole. The oil-collecting recess trench has a double inner screw shape oil-guiding ditch that is separately formed in clockwise and anti-clockwise direction and forms a plurality of crisscrosses in the oil-collecting recess trench. When the fan rotates, a lubricant in the oil-collecting recess trench is driven by the rotating fan shaft to flow the crisscrosses through the double inner screw shape oil-guiding ditch to circulate in the oil-collecting recess trench so as to achieve an internal-recycle oil-circulating system.

4 Claims, 3 Drawing Sheets

OIL-CIRCULATING STRUCTURE FOR FAN

FIELD OF THE INVENTION

The present invention is relating to a bearing lubricating structure for DC fan without bushing, particularly to an oil-circulating structure for fan.

BACKGROUND OF THE INVENTION

Since electronic device generates heat during operating, it will damage easily due to overheat without effective heat-dissipation. It is common to install a DC fan without bushing on electronic device for hest-dissipating. The DC fan without bushing has been well known to equip various bearings like a ball bearing or an oily bearing between fan and fan housing in order to enhance rotation and diminish noise for fan. The oily bearing possesses porous structure made by sintering copper alloy or iron alloy so as to absorb lubricant. However, the lubricant will be pushed to sputter by rotating a fan shaft to contaminate entire fan housing when the fan shaft in the oily bearing rapidly rotates, and the oil-retaining quantity of oily bearing reduces and distributes unevenly. Therefore, when the fan is used for a long time, the lubricating efficiency of bearing becomes bad gradually and noise of bearing becomes loud gradually, even the fan will stop rotating.

A heat-dissipating fan was disclosed in R.O.C. Taiwan Patent No. 471557 entitled "lubricating oil-circulating structure for fan shaft", which is composed of a housing, a stator and a rotor. A bearing has a bearing body with through holes and a ring portion is extended from one end of the bearing body to form an oil tank. A trench is set on the bearing body to make the released lubricant flow to the trench by passing the through holes then return to the oil tank and the through holes by passing the trench. Since the oil tank is set at the ring portion of the bearing and the trench is set on the bearing body, the lubricant will flow to the ring portion of the bearing and easy to contaminate the housing and oil-retaining quantity of bearing will decrease to weaken lubricating effect. Besides, the oil tank and the trench are the shape of a line easy to result in gathering lubricant at one side only, so that the oil-circulating efficiency of lubricant becomes worse.

SUMMARY

The primary object of the present invention is to provide an oil-circulating structure for fan. An oil-collecting recess trench has a double inner screw shape oil-guiding ditch that includes a left-hand internal thread oil-guiding ditch and a right-hand internal thread oil-guiding ditch. The left-hand internal thread oil-guiding ditch and the right-hand internal thread oil-guiding ditch crisscross in the oil-collecting recess trench to form a plurality of crisscrosses. A lubricant inside an oily bearing up-and-down flows inside the oil-collecting recess trench through the double inner screw shape oil-guiding ditch in order to enhance the internal-recycle oil-circulating efficiency.

The secondary object of the present invention is to provide an oil-circulating structure for fan. An oil-collecting recess trench has a double inner screw shape oil-guiding ditch that includes a left-hand internal thread oil-guiding ditch and a right-hand internal thread oil-guiding ditch. The left-hand internal thread oil-guiding ditch and the right-hand internal thread oil-guiding ditch crisscross in the oil-collecting recess trench to form a plurality of crisscrosses. A lubricant inside an oily bearing distributes over the oil-collecting recess trench by flowing through the double inner screw shape oil-guiding ditch so as to form an internal-recycle oil-circulating system for achieving oil-retaining and leak-proof efficiency without installing oil-retaining ring.

According to the oil-circulating structure of the present invention, an oily bearing is set in a fan housing. The oily bearing has an oil-collecting recess trench and a central axis hole for pivoting a fan shaft. The oil-collecting recess trench has a double inner screw shape oil-guiding ditch that includes a left-hand internal thread oil-guiding ditch and a right-hand internal thread oil-guiding ditch. The left-hand internal thread oil-guiding ditch and the right-hand internal thread oil-guiding ditch crisscross in the oil-collecting recess trench to form a plurality of crisscrosses. A lubricant inside the oily bearing up-and-down flows inside the oil-collecting recess trench through the crisscrosses of the double inner screw shape oil-guiding ditch in order to construct an internal-recycle oil-circulating system.

DETAILED DESCRIPTION OF THE PRESENT INVENTION

Figure 1:
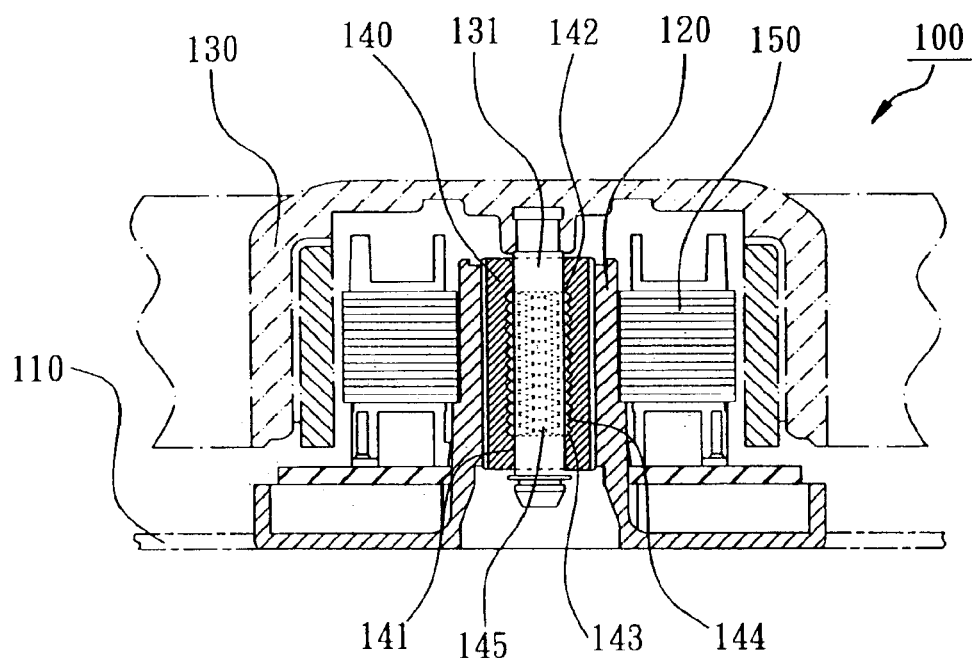
FIG. 1 is a cross sectional view illustrating a fan assembly with a fan oil-circulating structure in accordance with the present invention.

In relation to the fan oil-circulating structure, referring to FIG. 1, the heat-dissipating fan 100 comprises a fan housing 110, a pivoting base 120, a fan hub 130, an oily bearing 140 and stators 150. The oily bearing 140 is set between the fan housing 110 and the pivoting base 120. A central axis hole 141 is applied for pivoting a fan shaft 131 of the fan hub 130.

Figure 2:
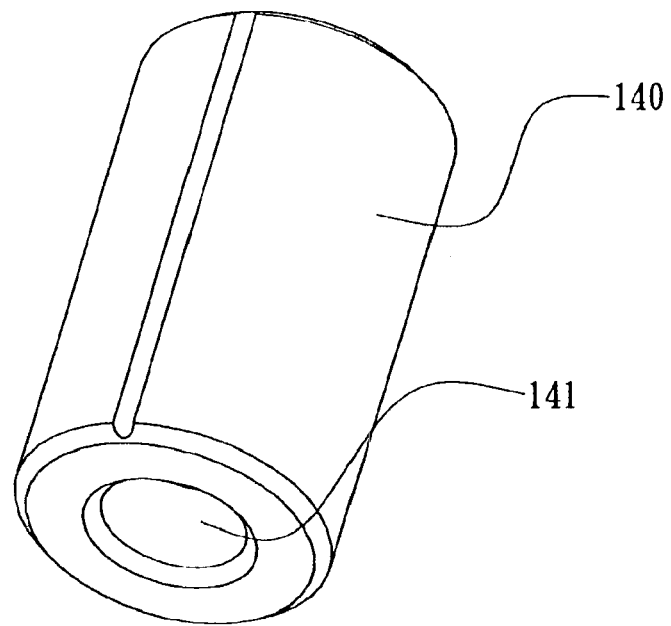
FIG. 2 is a perspective view of an oil-circulating structure for fan in accordance with the present invention.
Figure 3:
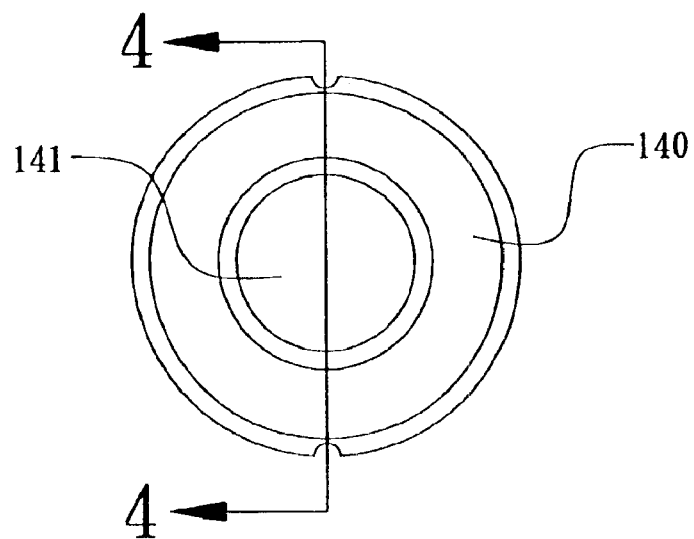
FIG. 3 is a top view of an oil-circulating structure for fan in accordance with the present invention.
Figure 4:
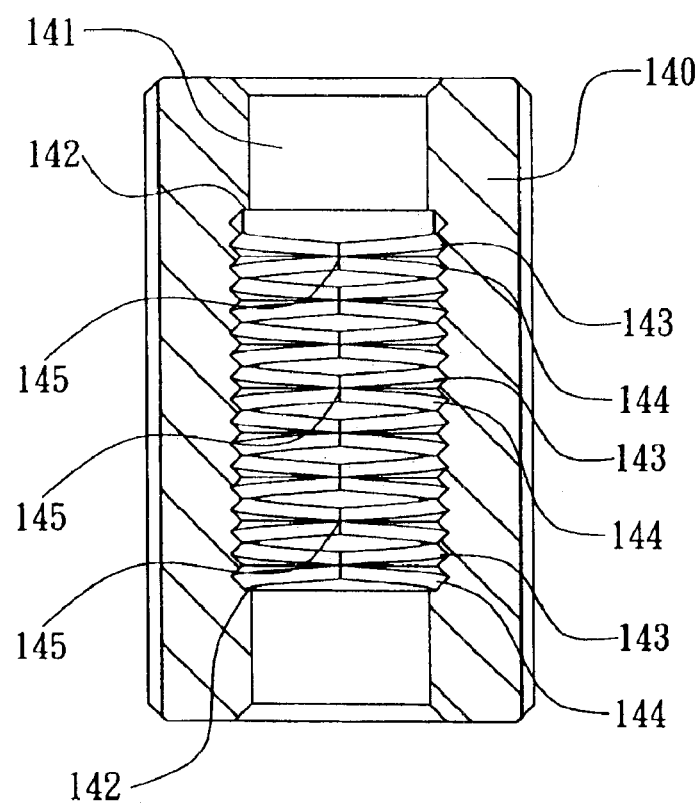
FIG. 4 is a cross sectional view of an oil-circulating structure for fan along FIG. 3 line 4—4 in accordance with the present invention.
Figure 5:
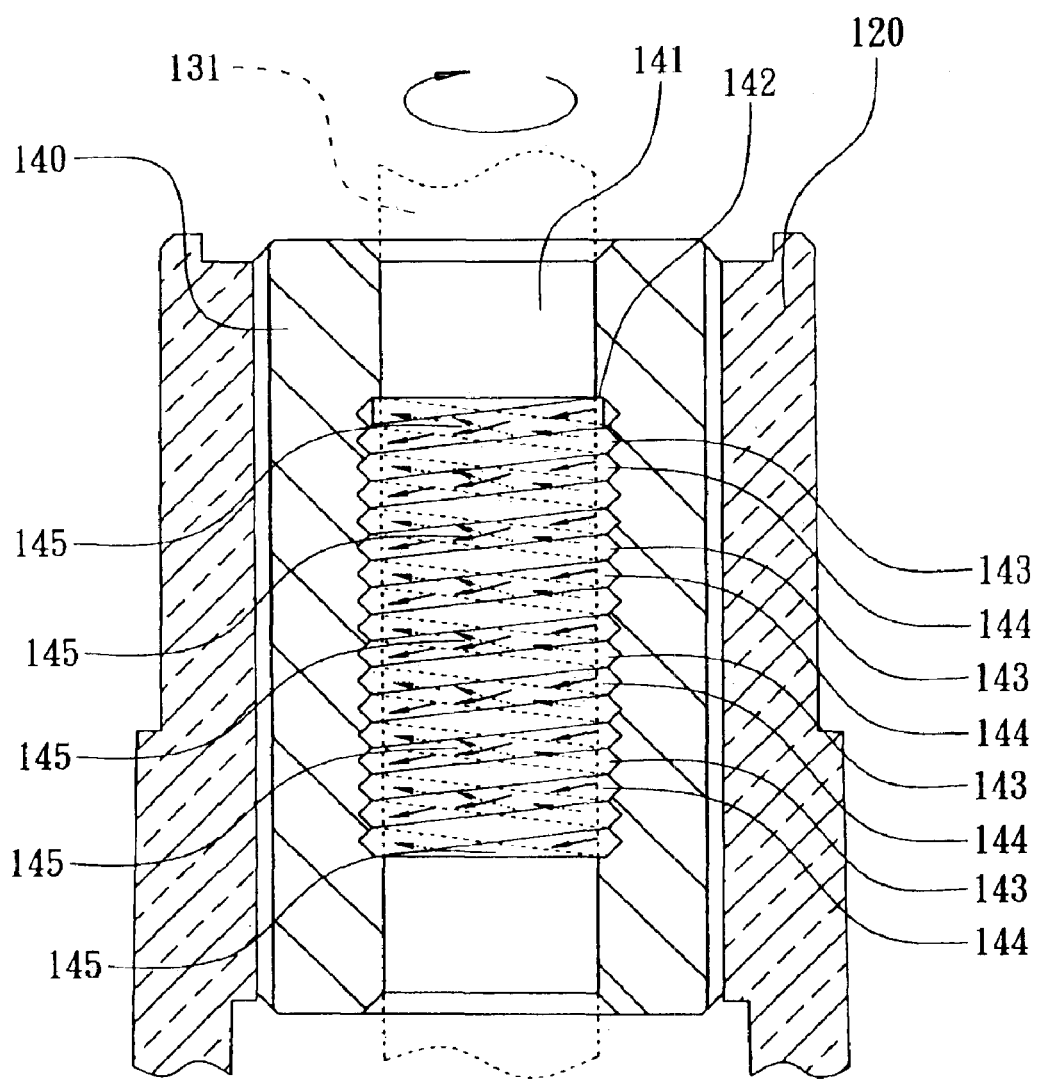
FIG. 5 is a cross sectional view of an oil-circulating structure for fan in a using status in accordance with the present invention.

Referring to FIGS. 2, 3 and 4, the oily bearing 140 has a central axis hole 141 and a hollow oil-collecting recess trench 142 is formed on the central axis hole 141 inside wall of the oily bearing 140 so as to store lubricant in the central axis hole 141 of the oily bearing 140. The oil-collecting recess trench 142 has a double inner screw shape oil-guiding ditch that includes a left-hand internal thread oil-guiding ditch 143 (clockwise direction) and a right-hand internal thread oil-guiding ditch 144 (anti-clockwise direction). The left-hand internal thread oil-guiding ditch 143 and the right-hand internal thread oil-guiding ditch 144 don't touch the fan shaft 131 when the fan shaft 131 is pivoted in the central axis hole 141. Thus lubricant can fully flow in the left-hand internal thread oil-guiding ditch 143 and the right-hand internal thread oil-guiding ditch 144. Both the left-hand internal thread oil-guiding ditch 143 and the right-hand internal thread oil-guiding ditch 144 may be square, V-shape, arc-shape or trapezoid, however in this embodiment they are V-shape. The left-hand internal thread oil-guiding ditch 143 and the right-hand internal thread oil-guiding ditch 144 crisscross in the oil-collecting recess trench 142 to form a plurality of crisscrosses 145 (showed in FIG. 4). Referring to FIG. 5, when the fan shaft 131 rotates, a lubricant flows through the left-hand internal thread oil-guiding ditch 143 and the right-hand internal thread oil-guiding ditch 144, in which separates at the crisscrosses 145 to up-and-down flow and recycle in the oil-collecting recess trench 142 so as to construct an internal-recycle oil-circulating system.

Referring to FIG. 1 and FIG. 5, the oily bearing 140 is set on the pivoting base 120 of the fan housing 110. A stator 150 like coil, circuit board is set around the pivoting base 120 for magnetically driving the fan hub 130 to rotate. When the stator 150 is powered on to generate electromagnetic induction for driving the fan hub 130 to rotate, the fan shaft 131 pivoted to the central axis hole 141 of the oily bearing 140 also rotates and pushes the lubricant inside the oil-collecting recess trench 142 to flow. Referring to FIG. 5, as indicated by arrowhead, the lubricant flows along the left-hand internal thread oil-guiding ditch 143 and the right-hand internal thread oil-guiding ditch 144 and is divided to the left-hand internal thread oil-guiding ditch 143 and the right-hand internal thread oil-guiding ditch 144 while flowing to the crisscrosses 145, and up-and-down recycles in the oil-collecting recess trench 142 so as to perform an internal-recycle oil-circulating efficiency. Therefore, the oil-circulating structure for fan has an excellent lubrication with an internal-recycle oil-circulation and achieves an excellent oil-retaining efficiency, and which is unnecessary to install conventional oil-retaining ring between conventional fan shaft and oily bearing.

The above description of embodiments of this invention is intended to be illustrated and not limiting. Other embodiments of this invention will be obvious to those skilled in the art in view of the above disclosure.

What is claimed is:

1. An oil-circulating structure for a fan comprising:
   an oily-bearing located in a fan housing of the fan and having:
   a) a central axis hole extending through a center thereof, a fan shaft of a fan hub of the fan being rotatably inserted into the central axis hole; and
   b) a hollow oil-collecting recess trench extending into an interior peripheral wall of the central axis hole and being spaced apart from two opposing ends of the central axis hole, the hollow oil-collecting recess trench having:
      i) a left-handed internal thread oil-guiding trench formed in an interior peripheral wall of and spirally extending a length of the hollow oil-collecting recess trench; and
      ii) a right-handed internal thread oil-guiding trench formed in the interior peripheral wall of and spirally extending the length of the hollow oil-collecting recess trench, the left-handed internal thread oil-guiding trench and the right-handed internal thread oil-guiding trench crisscrossing a predetermined number of times.

2. The oil-circulating structure according to claim 1, wherein the left-handed internal thread oil-guiding trench and the right-handed internal thread oil-guiding trench are spaced apart from the fan shaft.

3. The oil-circulating structure according to claim 1, wherein the left-handed internal thread oil-guiding trench is a ditch having a V-shaped cross-section.

4. The oil-circulating structure according to claim 1, wherein the right-handed internal thread oil-guiding trench is a ditch having a V-shaped cross-section.

* * * * *